United States Patent Office 3,432,826
Patented Mar. 11, 1969

3,432,826
RADIATION HARDENED RECORDING SYSTEM
Fred G. Hewitt, St. Paul, Minn., assignor to Sperry Rand Corporation, New York, N.Y., a corporation of Delaware
Filed Aug. 3, 1964, Ser. No. 386,823
U.S. Cl. 340—174                    11 Claims
Int. Cl. G11b 5/00; G01t 1/16

This invention relates to a means of recording a transient phenomenon by sampling at discrete intervals an electrical signal representative of such phenomenon and in particular to such a device whose record is not susceptible to nuclear radiation deterioration. The levels of the transient signal at the discrete sampled intervals are stored in magnetizable memory elements as a function of the degree of the partial switching of the element's magnetic flux.

The recording device utilized in this invention utilizes at least two magnetizable memory elements termed the signal core and the information core. The relatively long duration transient electrical signal that is to be sampled is coupled only to the signal core while the relatively short duration strobe pulse is currently, in time, coupled to both the information core and the signal core whereby the strobe pulse performs the function of a flux gate to the coincident sampled portion of the transient signal. The coincident sampled portion of the transient signal that is gated into the signal core causes a corresponding flux change in the magnetic state of the signal core which flux change in turn induces a back EMF in the drive line that couples the strobe pulse to the information core and the signal core. This back EMF effects an apparent increase, or decrease, in the strobe pulse drive line impedance—depending upon the relative polarities of the strobe pulse and the sampled portion of the transient signal—causing an effective decrease, or increase, in the MMF of the strobe pulse as coupled to the information core and the signal core. This effect upon the MMF of the strobe pulse as regards the magnetic state of the information core is a function of the amplitude and polarity of the transient signal sampled portion providing an indication, upon interrogation of the information core, of the amplitude and polarity of the transient signal sampled portion that was coupled to the signal core. The apparatus and method of operation of the memory elements of the recording device utilized in the present invention are more fully disclosed in the copending patent application of L.L. Harklau et al., Ser. No. 385,994, filed July 29, 1964 and assigned to the same assignee as is the present invention.

In recent years a considerable amount of time and effort has been expended upon the investigation of the effects of nuclear-weapon-burst and simulated-burst radiation on electronic components and semiconductor devices. Such work is principally concerned with the effects due to gamma ray and neutron bombardment of a transient radiation environment. Two reports—REIC Report No. 18, June 1, 1961 and REIC Report No. 26, Apr. 19, 1963, "Radiation Effects Information Center," Battelle Memorial Institute, Columbus, Ohio—cover this phase of the effects of nuclear radiation with a listing of probable component degradations. As pointed out in these above referenced reports, transient radiation effects on electronic components and semiconductor devices range from moderate to destructive with magnetic devices being the least susceptible to degraded performance.

Prolonged radiation such as in the immediate proximity of an active reactor affects magnetic properties much the same as prolonged heating. Those materials which owe their distinctive properties to special heat treatments are most rapidly and permanently affected by high energy radiation. Materials such as ferrites which have low Curie temperatures are impaired magnetically if their temperature rises excessively, either due to proximity to a heat source, or to internal conversion of radiant energy into heat. Otherwise, ferrites are notably immune to radiation damage, to either temporary or long time exposure.

With magnetic device as an established radiation-hardened device (i.e., a device whose operating characteristics are substantially unaffected by intense gamma ray and neutron bombardment) the present invention provides a portable recorder that is lightweight, that requires no external power and that may be placed in a transient radiation environment along with the device to be tested. The recorder provides a highly reliable, recoverable record of the measured, or detected phenomenon (i.e., the effect upon the tested device) as a result of exposure to such an environment.

In the preferred embodiment of applicant's invention, a sensor detects, or monitors the effect upon the operating characteristics of the device being tested while both items, the device being tested and the recorder, are in the transient radiation environment. The recorder converts the monitored characteristics, which may be in the form of a transient electrical signal, into discrete data levels, each discrete data level indicative of the level of the signal sampled portion. These discrete date levels are stored in corresponding separate detectors which are preferably magnetic memory elements such as toroidal ferrite cores or transfluxors. Upon cessation of the intense radiation bombardment, the recorder may be removed from the test environment and taken to laboratory-type facilities where the information stored in the detectors is read out and presented in a directly useable form.

In comparison to the method of the detection of transient phenomenon in electronic components and semiconductor devices due to transient radiation effects as made possible by applicant's invention, present day methods are costly and cumbrous. Conventional methods involve the remote recording of such effects by magnetic tape devices and monitor oscilloscopes. However, consider a device to be tested which has, for example, fifty separate effects to be monitored. As each separate effect, or phenomenon, requires a separate recording device, i.e., a separate magnetic tape unit or oscilloscope, such a testing procedure could require the investment of hundreds of thousands of dollars to provide a useful analysis of the effects of the test. Further, frequency response of these recording devices—as the monitored characteristic is a noncyclical transient electrical signal of microsecond duration—is insufficient to provide an accurate analysis of the initial reaction of the operating characteristics of the tested device to the transient radiation bombardment.

The uncertainty in the knowledge of actual nuclear weapon-burst bombardment radiation spectrum, real-time history and the relative effects of neutrons, gamma rays and neutron-induced gamma rays has made it difficult to calculate vulnerability numbers for simulated effects. Recent developments in effects measurements such as secondary photocurrent in transistors and neutron effects in capacitors have made it even more important to determine the response of components and circuits to an actual weapon radiation environment. Such a determination requires a low-cost recorder that is easily hand-carried and self-contained so that it could be placed in the radiation environment to monitor radiation effects at a plurality of locations from the radiation source. Real-time bunker-installed devices such as magnetic tape units and monitor oscilloscopes with cable connections to radiation sensors have been the only recording devices utilized up to the present time. However, as each item of data to be recorded requires a separate recording device, the use of such devices requires a near-prohibitive expense. Additionally, the electromagnetic fields accompanying actual weapon-burst bombardment radiation often causes complete destruction of the monitored signals through adverse effects upon the cabling coupling the monitored signal to the recording device. Consequently, a serious need has developed for a low-cost, portable, real-time recorder that is completely self contained and that requires no radiation shielding. The present invention provides a device whose recorded monitored data is substantially insensitive to a peak gamma-radiation pulse of ($10^{10}$ ergs g.$^{-1(C)sec-1}$ ergs per gram per second references to carbon), thermal shocks below the magnetic storage device's Curie temperature, overpressure, blast, electromagnetic field and ground shock.

Additionally, the effects of high energy electrons of semiconductor devices are currently of great interest because of increasingly frequent exposure of satellite space craft with electronic equipment to the Van Allen radiation belts. The present invention provides a device that could be exposed to such radiation and which would provide a recoverable record of the characteristics of such radiation belts.

Accordingly, it is a primary object of the present invention to provide a portable radiation-hardened recorder of transient phenomena due to intense transient nuclear radiation bombardment.

Another object of the present invention is to provide a recorder whose recorded information is substantially uneffected by gamma ray and neutron bombardment of a transient radiation environment.

Another object of the present invention is to provide a portable radiation-hardened recorder of transient phenomena which utilizes passive delay lines to convert transient electrical input into sampled portions, the amplitudes of the sampled portions defining the waveform.

A further object of the present invention is to provide a portable radiation-hardened recorder which converts a microsecond duration, nonreoccurring, electrical signal into discrete signal amplitudes representative of the electrical signal wave form and stores each such discrete signal in separate detecting means for subsequent readout.

This invention in its preferred embodiment utilizes memory elements of magnetizable material and in particular such elements that store discrete levels of data as a function of the degree of the partial switching of the elements' magnetic flux. Accordingly, a discussion of such elements and their modes of operation is given below.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements which possess the property of nondestructive readout, for by retaining the initial state of remanent magnetization after readout the rewrite cycle required with destructive readout devices is eliminated. As used herein, the term "nondestructive readout" shall refer to the sensing of the state of the remanent magnetization of a magnetizable core without destroying such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the switching threshold characteristic of a core having a substantially rectangular hysteresis characteristic. In this technique, a minimum of two interrogate lines thread the core's central aperture, each interrogate line setting up a magnetomotive force in the memory core of one-half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor" Rajchman and Lo, Proceedings of the IRE, March 1956, pp. 321–332. This method utilizes a "transfluxor" which comprises a core of magnetizable material of a substantially rectangular hysteresis characteristic having at least a first larger aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving nondestructive readout of the magnetic memory core is that disclosed in the article "Fluxlock-High Speed Core Memory," Instruments and Control Systems, Robert M. Tillman, May 1961, pp. 866–869. This method utilizes a bistable magnetic toroidal memory core having write and sense windings threading the core's central aperture and an interrogate winding wound about the core along a diameter of the core. Information is stored in the core in the conventional manner. Interrogation is achieved by coupling an interrogate current signal to the interrogate winding causing a temporary alternation of the core's magnetic state. Readout of the stored information is achieved by a bipolar output signal induced in the sense winding, the polarity phase of the readout signal indicating the information stored therein.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

PARTIAL SWITCHING

*Amplitude-limited.*—Condition wherein with a constant drive field amplitude, increase of the drive field duration will cause no appreciable increase in core flux density.

*Time-limited.*—Condition wherein with a constant drive field amplitude, increase of the drive field duration will cause appreciable increase in core flux density.

COMPLETE SWITCHING

*Saturated.*—Condition wherein increase of the drive field amplitude or duration will cause no appreciable increase in core flux density.

*Stable state.*—Condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal is gated by the strobe pulse into a separate magnetic device so that each separate magnetic device stores a flux level representative of the net magnetomotive force effect of the strobe pulse and that portion of the transient signal gated by the strobe pulse. The terms "signal," "pulse," "field," etc., when used herein shall be used interchangeably to refer to the current signal that produces the corresponding magnetic field and to the magnetic field produced by the corresponding current signal.

Accordingly, it is a primary object of the present invention to provide a system and a method for the sampling of a constant current source transient electrical signal.

It is a further object of the present invention to provide a system and a method for the flux gating of an incremental portion of a constant current source transient electrical signal by a constant current source time-limited strobe pulse.

It is a further object of the present invention to provide a system and a method whereby an electrical signal is sampled by a strobe pulse wherein the duration of the sampled portion of the electrical signal is determined by the duration of the strobe pulse.

It is a further and more general object of the present invention to provide a novel method of operating a magnetizable memory element as an electrical signal sampling device.

These and other more detailed and specific objects will be disclosed in the course of the following specification, reference being had to the accompanying drawings, in which.

Figure 1:
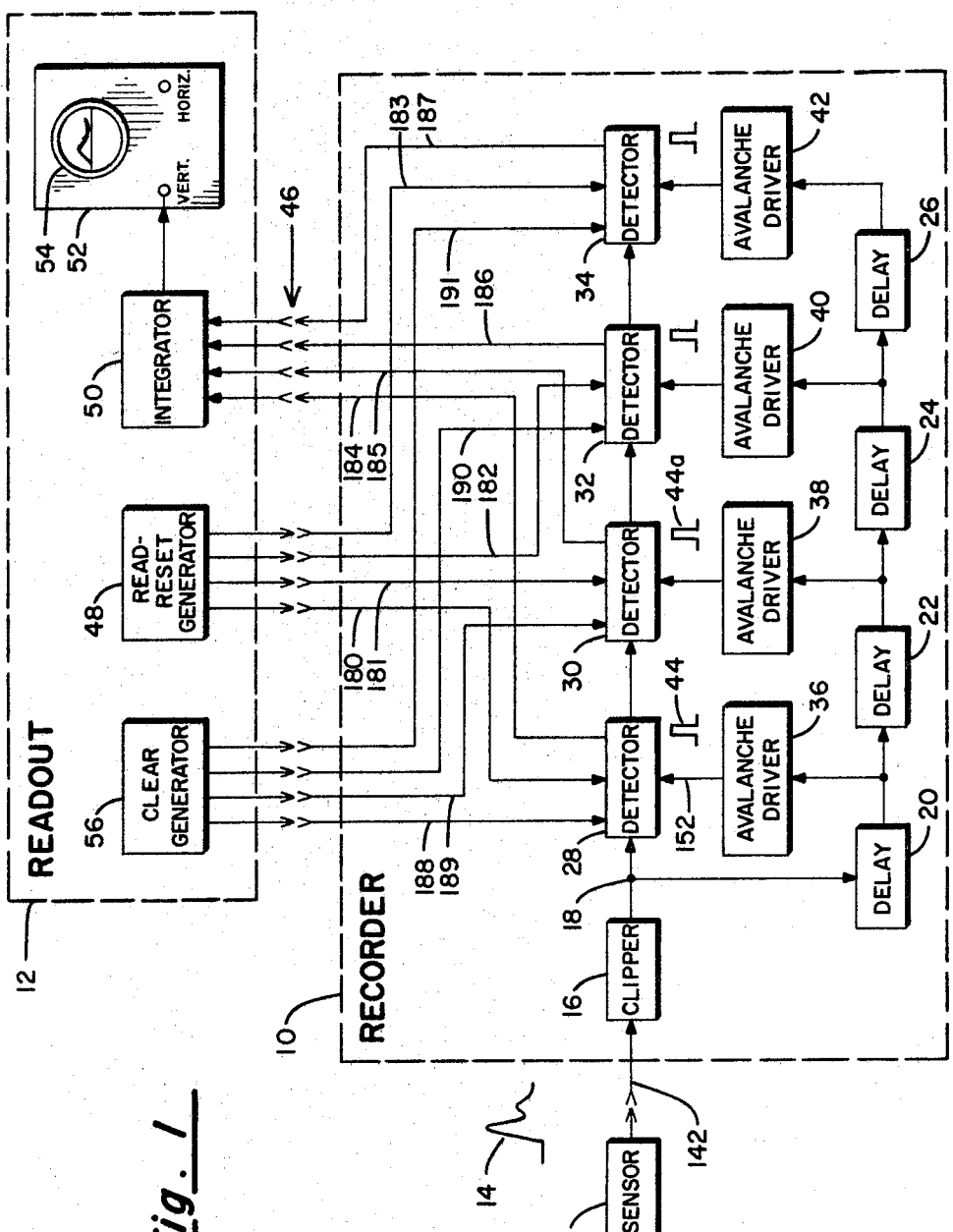
FIG. 1 is a block diagram of a preferred embodiment of a transient recorder and readout system incorporating the concepts of the present invention.

With particular reference to FIG. 1 there is disclosed a block diagram of a preferred embodiment of a low-cost, portable, real-time recorder that is completely self-contained requiring no external power supply or external control means. This preferred embodiment is substantially resistant over its operating range to an intense nuclear blast invironment and, as there is no shielding provided therewith, its constituent components must operate satisfactorily under such conditions. The embodiment of FIG. 1 essentially consists of three elemental parts: the separate sensor 8 that generates a constant current source type transient electrical signal that defines the sensed phenomenon; the portable recorder 10 that converts the transient electrical signal into discrete data levels, each data level indicative of the signal amplitude of a sampled portion of said transient signal, and that stores each data level in corresponding separate detectors;; and the laboratory type readout system 12 that provides the necessary input control signals and output devices that permit readout and evaluation of the data stored in the detectors of recorder 10.

In the embodiment of FIG. 1, sensor 8 couples a transient signal, for example signal 14, to clipper 16 of recorder 10 which in turn couples its output signal to node 18 which is a point providing a common electrical input to the remainder of recorder 10. Clipper 16 is, in this embodiment, serially arranged between the sensor 8 and node 18 and is included to limit the maximum, or peak, level of signal 14 to that level that can be accommodated by the subsequently serially aligned detectors. Signal 14 at node 18 is coupled to the parallel arranged serial-string of delays 20, 22, 24 and 26 and serial-string of detectors 28, 30, 32 and 34. Each of the parallel arranged avalanche drivers 36, 38, 40 and 42 upon initiation by the delayed output of its associated delay 20, 22, 24 and 26, respectively, couples a strobe pulse 44 to an associated detector 28, 30, 32 and 34, respectively. The concurrence in time of the strobe pulse 44 and the transient signal 14 at the respective detector causes a portion of said transient signal to be sampled over the duration of the strobe pulse and causes such sampled portion to be stored in the associated detector. As will be discussed in more detail below, as transient signal 14 travels through the serially aligned detectors 28–34 without any substantial delay thereby and as transient signal 14 is delayed by progressively longer delay times as it travels down the serially aligned delays 20, 22, 24, 26, the sampled portions of transient signal 14 that are stored in detectors 28, 30, 32, 34 are sampled portions that are progressively greater, in time, from the wave front of transient signal 14. Consequently, the first detector to be encountered by signal 14, will sample a first portion of signal 14 waveform while the last detector to be encountered by signal 14 will sample a last portion of signal 14 waveform. It is apparent that any combination of delay times of delays 20–26 may be utilized to provide the desired sampling program. As an example, if the wave front of signal 14 is to be sampled, delay 20 would be deleted providing no delay between the coupling of signal 14 from clipper 16 to detector 28 and the coupling of strobe pulse 44 from driver 36 to detector 28. Alternatively, if a last half of signal 14 waveform only is to be sampled over a plurality of different delay times, delay 20 would provide a relatively long delay time of substantially one-half the time duration of signal 14 with delays 22, 24, and 26, each providing relatively short delay times spaced so as to sample the desired portions of the last half of signal 14.

Delays 20–26 may each delay signal 14 an approximately equal delay time, such as 2D. Accordingly, if the recorder 10 is to record the wave front of signal 14 delay 20 would provide a zero delay time—effectively deleted—with delays 22–26 each providing a like delay time 2D. Delay 20 couples the nondelayed signal 14 to both driver 36 and delay 22 causing driver 36 to generate strobe pulse 44, which for this example may be of a duration D, which it in turn couples to detector 28 concurrent with the coupling of signal 14 thereto from clipper 16. Accordingly, detector 28 samples the wave front of signal 14 over the duration D of strobe pulse 44. Delay 22 delays signal 14 from delay 20 a delay time 2D coupling the 2D delay signal 14 to both driver 38 and delay 24 causing driver 38 to generate strobe pulse 44a which it couples to detector 30 concurrent with the coupling of signal 14 thereto from detector 28. Accordingly, detector 30 samples the waveform of signal 14 at a delay time 2D over the duration of strobe pulse 44a. In a like manner delays 24 and 26 each progressively delay signal 14 a delay time 2D causing portions of signal 14 at delay times 4D and 6D, respectively, to be sampled at and stored in detectors 32 and 34, respectively.

Once the information is stored in recorder 10, readout system 12 may be utilized to readout and evaluate such information. With readout system 12 coupled to recorder 10 at connector 46 read-reset generator 48 couples the proper read signal individually and selectively to detectors 28–34. Output signals indicative of the information stored in detectors 28–34 are, upon the separate coupling of the read signal thereto, coupled to integrator 50 which integrates the output signals from detectors 28–34 providing a representative signal which is coupled to the vertical input terminal of oscilloscope 52. The signal trace on oscilloscope face 54 is then capable of evaluation as to the signal amplitude defining the level of the information stored in the respective detector. Alternatively, the output of integrator 50 could be coupled to a signal analyzer that could provide a direct reading of the level of the information stored in the respective detector. After evaluation of the stored information, clear generator 56 couples a clear signal to detectors 28–34 clearing the information stored therein and preparing them for a subsequent recording operation.

Figure 2:
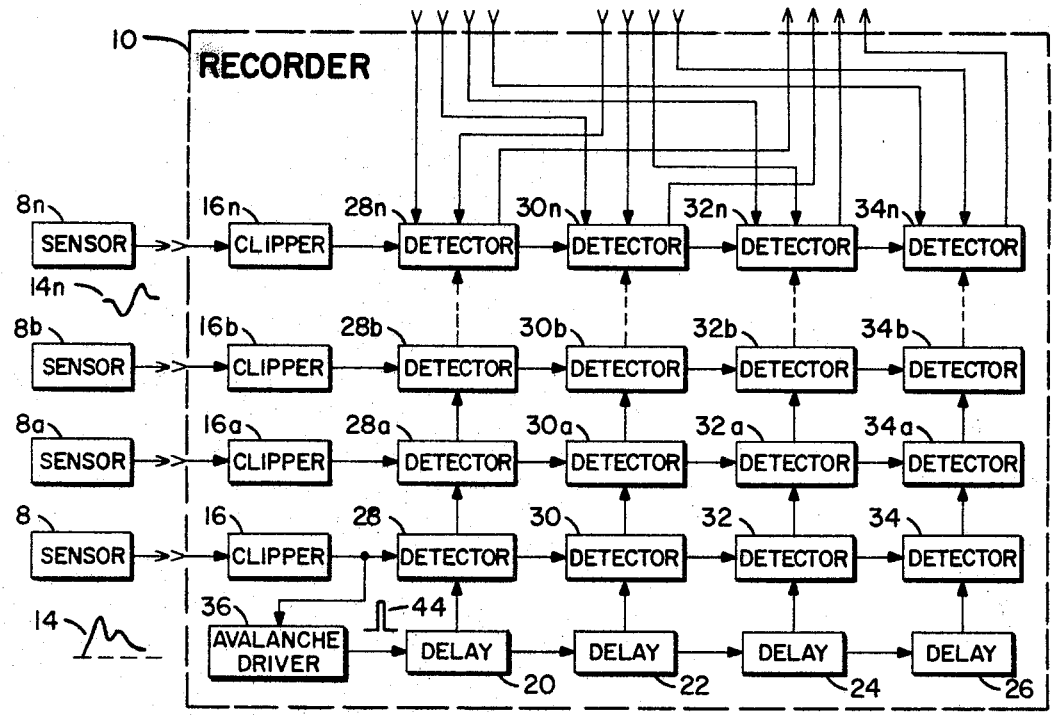
FIG. 2 is a block diagram of a second preferred embodiment of the recorder of FIG. 1 providing multichannel recording of a plurality of transient electrical signals.

With particular reference to FIG. 2 there is disclosed a block diagram of a second preferred embodiment of the present invention. This is a modification of the recorder 10 of FIG. 1 wherein there is a plurality of parallel-arranged serial-strings of sensor-clipper-detectors. Operation of the system of FIG. 2 is similar to that of FIG. 1 with the only essential difference being that in the system of FIG. 2 signal 14 is initially converted by driver 36 to a strobe pulse 44 with each succeeding delay 20, 22, 24, 26 successively delaying strobe pulse 44 the appropriate additional delay time. Signal 14 and the successively delayed strobe pulses 44 are concurrently coupled to the associated detectors causing the successive concurrently sampled portions of transient signals 14–14m to be stored in the associated detectors. Additionally, there is provided a multichannel capability wherein each serial string of sensor-clipper-detectors forms a separate recording channel, each channel being capable of recording a separate transient phenomenon. In this embodiment the strobe pulse that is emitted from each delay is coupled serially to the like ordered detectors of each channel; i.e., strobe pulse 44 when emitted from delay 20 is serially coupled to detectors 28, 28a, 28b . . . 28n, providing a stored sample at the delay of delay 20 of the transient phenomena detected by the associated channel sensors. For the sake of clarity the various control and readout lines associated with each detector are illustrated for only the detectors of channel n.

Figure 3:
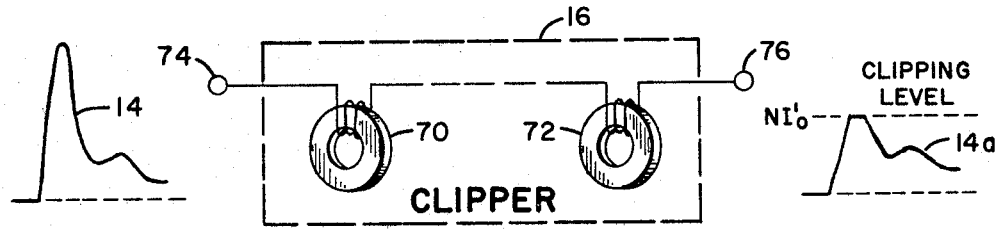
FIG. 3 is an illustration of a magnetic clipper that may be used with the recorder of FIG. 1.

With particular reference to FIG. 3 there is disclosed an illustration of a magnetic clipper which may be utilized as clipper 16 of FIG. 1. In this embodiment it is the purpose of clipper 16 of clip off, or remove, that portion of the input signal 14 whose amplitude exceeds the switching threshold $NI_o$ of the storage elements or when combined with the coincident in time strobe pulse is larger than the storage capacity of the associated detector. Cores 70 and 72 may be typical bistable ferrite cores whose switching threshold is equal to $NI_o'$—see FIG. 14. Prior to any recording, cores 70 and 72 are set into the negative saturated remanent magnetic state by a clear pulse such as that from clear generator 52 which is of a negative saturating current pulse sense. A positive current pulse, such as signal 14, having no portion thereof greater than $NI_o'$ when coupled to input terminal 74 would pass uneffected—except for a possible increase in rise time—through clipper 16 and would be emitted at terminal 76. However, any portion of signal 14 greater than $NI_o'$ would cause the magnetic flux of cores 70 and 72 to be switched toward the positive saturated remanent magnetic state. Concurrent with this flux reversal, a back EMF will be induced in the turns about the cores which EMF is in opposition to the incoming signal 14. The resultant output at terminal 76 will effectively consist of signal 14a which ideally is that portion of the incoming signal 14 whose amplitude does not exceed the MMF of $NI_o'$. The clipping level $NI_o'$ for a given core is dependent upon the number of turns about the core; the amount of clipping of the incoming signal 14 is determined by $N\phi$, where $\phi$ is the volt-time integral of the core per turn and $N$ is the number of turns about the core.

Figure 4:
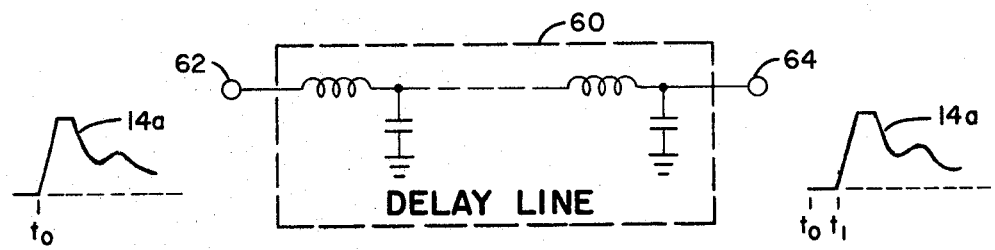
FIG. 4 is an illustration of a delay line that may be used with the recorder of FIG. 1.

With particular reference to FIG. 4, there is disclosed an illustration of a lumped constant delay line that may be utilized as the delays 20–26 of FIG. 1. In this embodiment delay line 60 having input terminal 62 and output terminal 64 is made up of a cascaded series of LC sections the parameters of which are adjusted to delay signal 14a at input terminal 62 the delays of 2D, 4D, 6D . . . nD at output terminal 64. Although a lumped constant delay line is illustrated any appropriate form of delay line may be utilized. See the text "Pulse and Digital Circuits," McGraw-Hill, pp. 286–321 for an excellent discussion of delay line theory.

Figure 5:
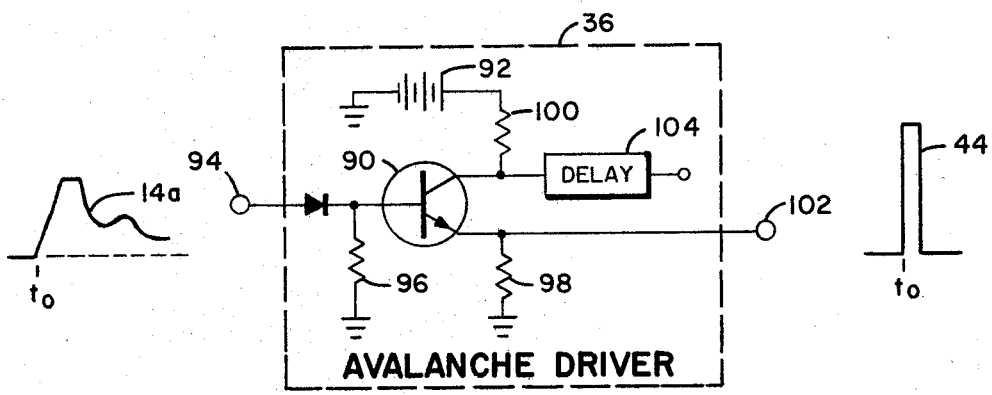
FIG. 5 is an illustration of an avalanche driver transistor amplifier that may be used with the recorder of FIG. 1.

With particular reference to FIG. 5, there is disclosed an illustration of an avalanche driver that may be utilized as drivers 36–42 of FIG. 1. In this embodiment it is the purpose of driver 36 to generate strobe pulse 44 upon activation by signal 14. As recorder 10 is primarily for the purpose of recording sampled portions of a transient signal while in an environment of intense nuclear radiation, recorder 10 is considered to be a one-shot recording device. That is, the recorder is to be exposed to a single transient signal, to record sampled portions thereof and then to have the stored data readout in laboratory type facilities by readout system 12 prior to exposure to a subsequent transient signal. As the radiation environment may have a permanent degrading effect upon the operating characteristics of avalanche transistor 90 and battery 92, such components are considered to be expendable items and may, if necessary, be replaceable parts to be replaced after each exposure to the radiation environment.

With no signal coupled to terminal 94 of driver 36, transistor 90 is reverse biased into the normal nonconducting mode by the biasing arrangement of resistors 96, 98, and 100 and the positive voltage source of battery 92 providing a zero voltage signal at output terminal 102. The capacitors of open ended delay line 104 (see FIG. 4) are then charged to a potential of approximately 130 volts by battery 92 through resistor 100. When signal 14 is coupled to terminal 94 the collector-base electrode junction of transistor 90 is reverse biased beyond its avalanche breakdown potential and the collector-emitter electrode junction breaks down causing it to appear as a short circuit to the charge stored in the capacitors of delay line 104; resistor 100 is of a large value, such as 100,000 ohms, such that battery 92 is effectively isolated from transistor 90 during this breakdown period. Additionally, the circuit of FIG. 5 is itself capable of avalanche breakdown upon exposure to a radiation burst of the proper characteristic. If such a radiation burst is expected and the recorder of FIG. 2 is utilized signal 14 need not be coupled to avalanche driver 36 but the delays 20–26 would then be coupled between avalanche driver 36 and the respective detectors 28–34 delaying the strobe pulse rather than transient signal 14. Delay line 104 then discharges through the collector-emitter electrode junction of transistor 90 to ground through resistor 98 causing a high amplitude strobe signal 44 to appear at terminal 102. The delay line 104 continues to discharge through resistor 98 over a period twice the delay of delay line 104. Consequently, with a desired strobe pulse duration of, for example, 50 ns. (nanoseconds), the delay of delay line 104 is 25 ns. After this time delay line 104 is ineffective to hold the collector-emitter electrode junction of transistor 90 in its avalanche mode and transistor 90 reverts to its nonconducting mode again causing a zero potential signal to appear at terminal 102.

Figure 7:
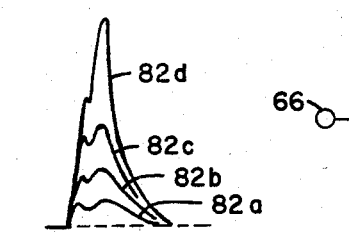
FIG. 7 illustrates a set of typical readout signal waveforms from the detectors of the recorder of FIG. 1.
Figure 6:
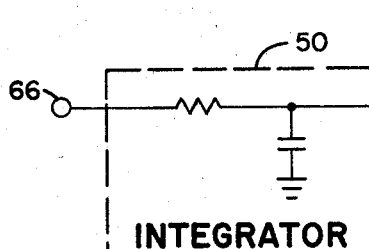
FIG. 6 is an illustration of an integrator that may be used with the readout system of FIG. 1.
Figure 8:
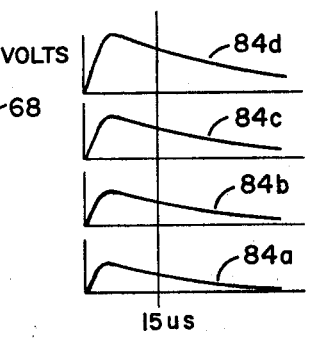
FIG. 8 is a diagram of a set of typical displays upon the face of the oscilloscope of FIG. 1 for the corresponding waveforms of FIG. 7.

With particular reference to FIG. 6 there is disclosed an illustration of an integrator that may be utilized as integrator 50 of FIG. 1. In this embodiment it is the purpose of integrator 50 to integrate the output signals of detectors 28–34 coupled to input terminal 66 and to provide at output terminal 68 a signal whose waveform can provide a reliable means of calibrating such detector output signals to provide a satisfactory correlation of the level of the data stored in the respective detector with a measured output signal amplitude. In one method of achieving such correlation, detector output signals 82a, 82b, 82c and 82d of FIG. 7, each representative of a different level of data stored in detectors 28, 30, 32, 34, respectively, when integrated by integrator 50 produced the integrator output signals 84a, 84b, 84c, and 84d, respectively, of FIG. 8. Upon the observation and calibration of signals 84a, 84b, 84c, and 84d as displayed upon oscilloscope face 54 it was determined that the amplitudes of such signals after a certain delay time, for example at a time 15 μsec. (microseconds) after their wave-fronts, were in direct correlation with the levels of the data stored in the respective detectors.

To better understand a novel aspect of the present invention, a discussion of a constant current source driving signal as opposed to the use of a constant voltage source driving signal is presented.

Figure 9:
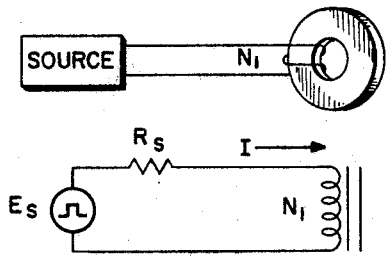
FIG. 9 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 9 illustrates the general circuit of a source driving a toroidal ferrite core with its equivalent circuit:

$E_s$=source voltage
$R_s$=source internal resistance
$N_1$=number of turns in the coil about the core
$I$=current flowing through the coil about the core This circuit may be defined mathematically by Equation 1

$$E_s = IR_s - N\frac{d\phi}{dt} \qquad (1)$$

with it being assumed that the core is always initially in its negative saturated state and that the drive signal from the source drives the magnetic state of the core toward its positive saturated state. By making $R_s$ sufficiently small enough, Equation 1 reduces to Equation 2.

$$E_s \cong -N\frac{d\phi}{dt} \qquad (2)$$

Therefore, by making $R_s$ sufficiently small the conditions of a constant voltage source as fulfilled. Since $E_s$ and $N$ are constants, $d\phi/dt$ is also a constant, and consequently the flux reversal is a linear function of time.

$$\int_{-\phi_s}^{\pm\phi_1} d\phi = \frac{E_s}{N_1}\int_0^t dt$$

$$\phi_s - \phi_1 = \frac{E_s t}{N_1} \qquad (3)$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi = \frac{E_s}{N_1}\int_0^{T_s} dt$$

$$2\phi_s = \frac{E_s T_s}{N_1} \qquad (4)$$

The voltage $E$ induced in any coil about the core is (with $N_2$=the number of turns of a second coil on the core)

$$E = \frac{E_s N_2}{N_1} = \frac{2\phi_s}{T_s}N_2$$

Figure 11:
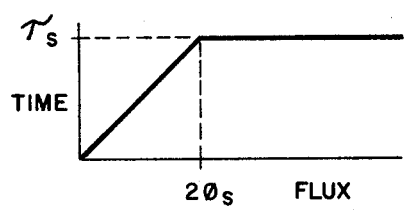
FIG. 11 is an illustration of the plot of flux versus time of the core of FIG. 9.
Figure 10:
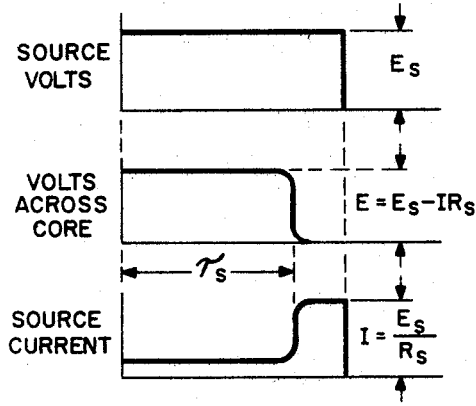
FIG. 10 is an illustration of the resulting voltages and currents of the circuit of FIG. 9 when driven by a constant voltage source.

The resulting voltages and currents under constant voltage source conditions are illustrated in FIG. 10, Equations 3 and 4 show that a plot of flux $\phi$ versus time would be as illustrated in FIG. 11. It is under these constant voltage source conditions that a toroidal ferrite core can be used as a counter, integrator or accumulator. See Patents Nos. 2,968,796 and 2,808,578 for typical uses of this principle of a constant voltage source. It is to be noted that the linear relationship of the plot of flux $\phi$ versus time over the range of $0 < \phi < 2\phi_s$ as illustrated in FIG. 11 is due to the characteristics of the constant voltage source rather than those of the core.

If $R_s$ is made sufficiently large, Equation 1 reduces to Equation 5.

$$E_s \cong IR_s \qquad (5)$$

Figure 12:
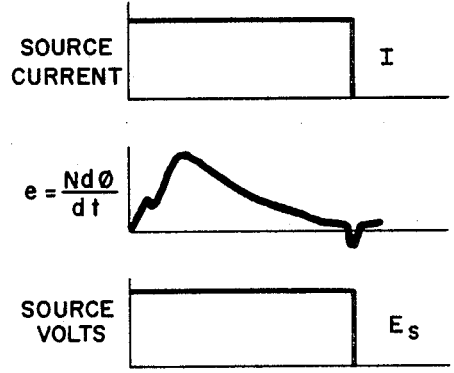
FIG. 12 is an illustration of the resulting voltages and currents of the circuit of FIG. 9 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 12. It is under these constant current source conditions that this present invention is concerned.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s = S_w/H - H_o = S_{w'}/NI - NI_o$$

where:

$r$ = Radius of toroidal core
$\tau_s$ = Switching time
$I$ = Current in amperes
$S_w$ = Material constant
$N$ = Number of turns
$H$ = Applied field in oe (oersteds) = $NI/5r$
$H_o$ = Switching threshold in oe = $NI_o/5r$
$Sw' = Sw5r$ Since the applied field H is inversely proportional to the radius of the core, flux reversal takes place faster in an inside ring of the core than in an outside ring of the core. Applying a time-limited drive field to the core results in a flux reversal distribution which decreases with increase in radial distance. That portion of the core which is in a partial switched state exhibits magnetic properties which are similar to a demagnetized state except for some asymmetry. The amount of asymmetry and the shape of the curve for a time-limited state are functions of both the drive field amplitude and duration.

Figure 13:
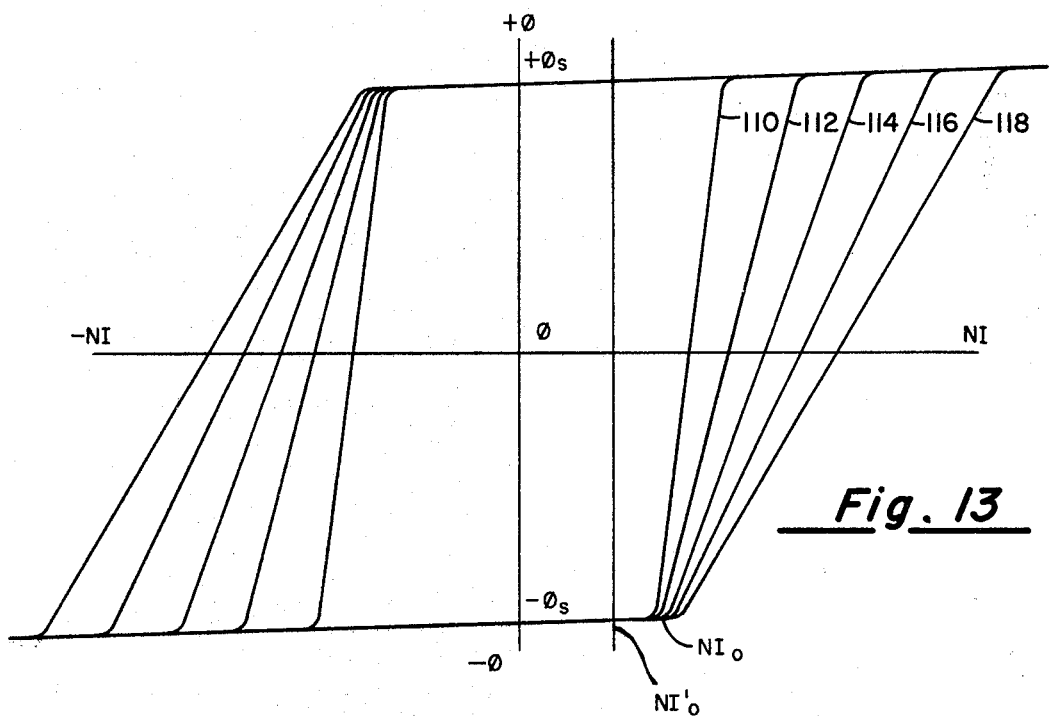
FIG. 13 is an illustration of the residual magnetization curves of the core of FIG. 9 utilizing the time-limited different-amplitude flux sampling strobe pulse of the present invention.

With particular reference to FIG. 13 there is illustrated a residual magnetization curve 110 of the magnetic devices utilized by the present invention. Curve 110 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 112–118 are residual magnetization curves and are plots of irreversible flux $\phi$ versus the applied magnetomotive force NI wherein the drive current signal for each curve is of a constant but different duration, and of increasing amplitude, i.e., curve 118 is for that of a pulse of the shortest duration and curve 112 is for that of a pulse of the longest duration. Each curve is obtained by using a drive current signal of a constant duration less than $\tau_s$ and successively increasing the signal amplitude for each successive application of the drive current signal. The net irreversible flux $\phi$ for each applied drive current signal is then plotted versus the applied magnetomotive force NI to provide the curve 12–18 for each particular drive current signal duration.

In the particular application of applicant's illustrated embodiment there is utilized a strobe pulse 44 (see FIG. 14) which is of a sufficient amplitude but of insufficient duration to switch the magnetic state of the coupled core from $-\phi_s$ to $+\phi_s$. This strobe pulse 44 is obtained from a constant current source and is limited in duration, e.g., time-limited, so as to set the magnetic state of the core in the flux state $\phi_0$ of curve 118. Any variation in the amplitude of strobe pulse 44 causes the magnetic state of the coupled core to be set into a different flux state between the limits of $+\phi_s$ and $-\phi_s$.

Figure 14:
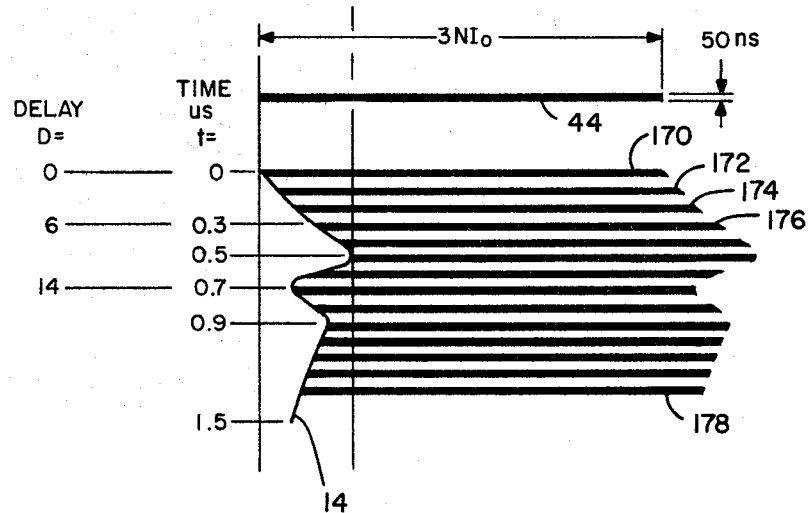
FIG. 14 is an illustration of a plot of a series of varying delayed strobe pulses upon a transient signal.

The present invention is concerned with a system utilizing a detector for and a method of sampling a transient current signal using the partial switching of a magnetic element. With particular reference to FIG. 14, there is illustrated a typical transient signal 14 which is to be sampled at any one or a plurality of times. Signal 14 is assumed to originate in a constant current source and is, in this embodiment, a unidirectional signal whose maximum NI as regards the coupled device is less than $NI_o$, the switching threshold of the magnetic element. Of course, no such limitation as to the unidirectional character of the transient current signal is intended herein for a bidirectional signal could be utilized as disclosed in the aforementioned copending patent application of L. L. Harklau et al.

With particular reference to FIG. 1, there is illustrated a block diagram of a recorder system whereby such sampling may be accomplished. Assume that the sensor 8 detects a transient phenomenon such as a nuclear weapon burst whose radiation intensity versus time characteristic is defined by signal 14. Signal 14 is coupled to line 142 which after passing unaffected through clipper 16 is in turn coupled to the parallel arranged serial-string of delays 20, 22, 24, and 26 and serial-string of detectors 28, 30, 32 and 34 at node 18. Delays 20, 22, 24 and 26 may each delay signal 14 an appropriate time such as 0, 2D, 4D, and 6D, respectively, and accordingly delay 20 after a delay 0, would couple signal 14 to both delay 22 and driver 36. Driver 36 would emit strobe pulse 44 which is coupled by way of conductor 152 to detector 28. Strobe pulse 44 acts as a constant current source flux gate gating into detector 28 that portion of signal 14 which is concurrent with pulse 44. Accordingly, detector 28 would sample the wave front of signal 130 over the duration of strobe pulse 44 while detectors 30, 32 and 34 would sample signal 14 beginning at delays of 2D, 4D and 6D, respectively, over the duration of strobe pulse 44. As the present invention utilizes strobe pulse 44 as a flux gate to the sampled portion of signal 14 the information stored in detectors 28, 30, 32 and 34 would be the net effect of the magnetomotive force of strobe pulse 44 and that magnetomotive force of that concurrent portion of signal 14 from the various delays 20, 22, 24, and 26. As an example: in detector 28, signal 14 is gated by the non-delayed strobe signal 44 of 0 to sample the leading edge of signal 14 as at pulse 170 of FIG. 14; in detector 30, signal 14 is gated by the delayed strobe signal 44 of 2D to sample signal 14 at a delay of 2D as at pulse 172; in detector 32, signal 14 is gated by the delayed strobe signal 44 of 4D to sample signal 14 at a delay of 4D as at pulse 174; while in detector 34, signal 14 is gated by the delayed strobe signal 44 of 6D to sample signal 14 at a delay of 6D as at pulse 176.

As a further example, assume that the system of FIG. 1 contains a parallel arranged serial-string of 14 delays such as that formed by delays 20–26 and a serial-string of 14 detectors such as that formed by detectors 28–34, that strobe pulse 44 is 50 ns. (nanoseconds) or 1D in duration and that each successive delayed signal 14 is delayed an additional increment 2D of 100 ns., i.e., the longest delay is 2D ($n$–1) or 26D or 1.30 $\mu$sec. (microseconds) with the delay 20=0. Avalanche driver 36 would emit a strobe pulse 44 concurrent with the coupling of signal 14 thereto causing the wave front of signal 14 to be sampled by the delay 20, driver 36, detector 28 set as at pulse 170. The delay-driver-detector sets having the progressively greater delay of strobe pulse 44 would have progressively delayed samples of signal 14 as at pulses 172, 174, 176, etc., until the delay-driver-detector set having the greatest delay of strobe pulse 44 would have the greatest delayed sample of signal 14 as at pulse 178. At this time the fourteen detectors would each have stored therein discrete levels of flux, each level indicative of the amplitude of the sampled portion of signal 14. Subsequent to the sampling procedure outlined above, the information stored in each detector could be read out by coupling a read, or interrogate, signal thereto as at readout lines 180, 181, 182 and 183 causing an output signal representative of the flux level stored in each detector to be coupled to the output lines 184, 185, 186 and 187 of detectors 28, 30, 32 and 34, respectively. After evaluation of the readout information and in preparation for a subsequent recording operation a clear signal from clear generator 54 could be coupled to clear lines 188, 189, 190 and 191 clearing detectors 28, 30, 32 and 34 respectively.

Figure 15:
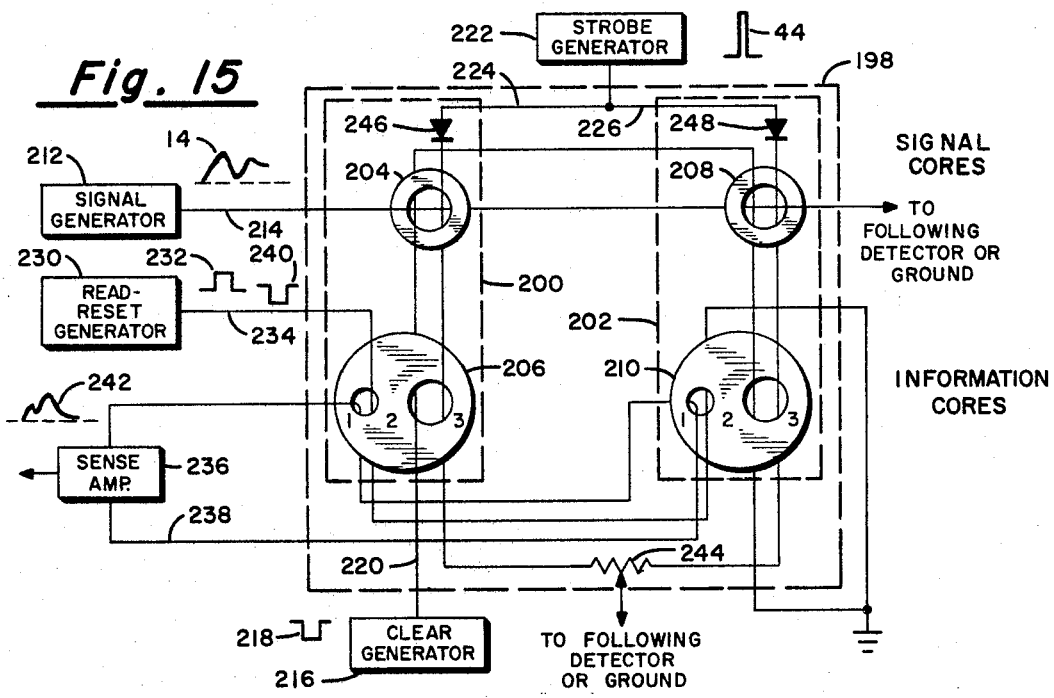
FIG. 15 is an illustration of the detector utilized in the present invention.

With particular reference to FIG. 15 there is disclosed the detector 198 of the present invention. Detector 198 is comprised of two toroidal core-transfluxor core sets; the operation of each set of which is fully disclosed in the aforementioned copending patent application of L. L.

Harklau et al. As more fully discussed in such copending patent application, each set includes a signal core and an information core, such as toroidal ferrite signal core 204 and transfluxor information core 206 of set 200, each core having the magnetic characteristics of FIG. 13.

Figure 16A:
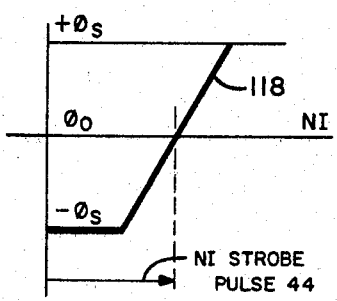
FIG. 16a is an illustration of the effect of the strobe pulse upon a first-polarity-wound-set information core.
Figure 16B:
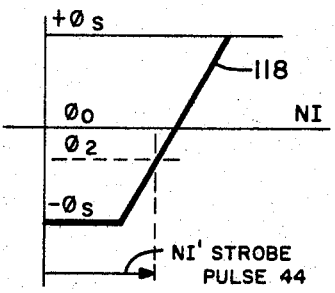
FIG. 16b is an illustration of the effect of the combination of the strobe pulse and a first polarity sampled portion of the transient signal upon the first-polarity-wound-set information core.
Figure 18A:
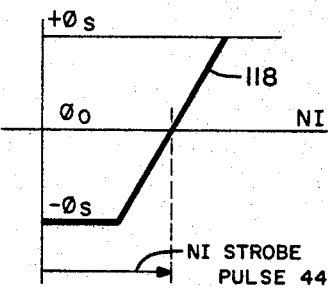
FIG. 18a is an illustration of the effect of the strobe pulse upon the second-polarity-wound-set information core.
Figure 18B:
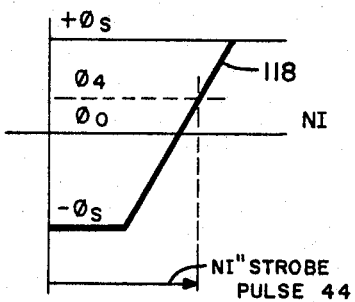
FIG. 18b is an illustration of the effect of the combination of the strobe pulse and a first polarity sampled portion of the transient signal upon the second-polarity-wound-set information core.
Figure 17A:
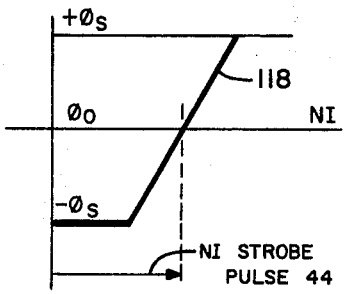
FIG. 17a is an illustration of the effect of the strobe pulse upon the first-polarity-wound set signal core.
Figure 17B:
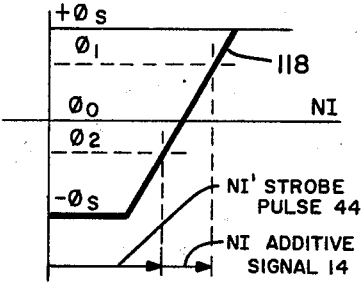
FIG. 17b is an illustration of the effect of the combination of the strobe pulse and a first polarity sampled portion of the transient signal upon the first-polarity-wound-set signal core.
Figure 19A:
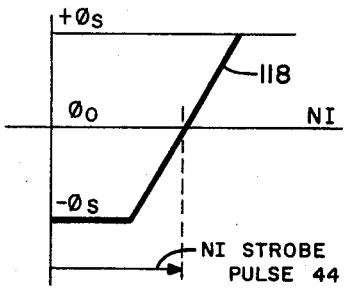
FIG. 19a is an illustration of the effect of the strobe pulse upon the second-polarity-wound-set signal core.
Figure 19B:
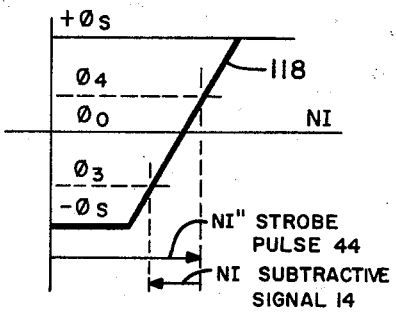
FIG. 19b is an illustration of the effect of the combination of the strobe pulse and a first polarity sampled portion of the transient signal upon the second-polarity-wound-set signal core.

The parallel arrangement of sets 200 and 202 permits the serial coupling of a plurality of detectors 198. The operation of each set, such as sets 200 and 202, in a serially arranged plurality of sets requires that the strobe pulse drive line impedance be independent of the signal level of the sampled portion of the transient signal that is sampled in each set of the sets that are serially coupled by the common strobe pulse drive line. This is so as storage of the information in the information core in each set is a function of the change in the strobe pulse drive line impedance due to the back EMF induced in the strobe pulse drive line due to the transient signal sampled portion that is coupled to the signal core of the same set. By coupling the two sets of each detector in parallel and operating each set of the detector in an opposing magnetic sense a change in strobe pulse drive line impedance in each set is of an equal but opposite effect making the net external effect of the detector upon the impedance of the strobe pulse drive line as it passes through the detector equal to zero. Thus, the parallel arranged sets 200 and 202 of detector 198 effectively isolate the internal strobe pulse drive line impedance variations from each other by serially arranged detector 198. Additionally, by coupling the small aperture in each transfluxor in an opposing magnetic sense by the sense line the total flux change detected by the sense line upon readout is the difference-signal between the flux states in the flux paths defined by the small apertures of the signal cores of each set thus providing an output signal that has a direct correlation with the amplitude and polarity of the transient signal sampled portion. Further, the use of a transfluxor as the information core permits the nondestructive readout of the information stored therein. Operation of the detector of FIG. 15 is best explained by the use of FIGS. 16a, 16b; 17a, 17b; 18a, 18b; 19a, 19b. For an exemplary explanation of the operation of the illustrated embodiment of FIG. 15, unidirectional transient signal 14 is of a maximum amplitude less than $NI_o$—see FIG. 14—and is coupled at time $t=0$ to signal cores 204 and 208 by constant current type signal generator 212 by way of drive line 214. Strobe pulse 44 is, as discussed above, of a time-limited amplitude-duration characteristic such as to drive the magnetic states of signal cores 204 and 208 from an initial saturated state $-\phi_s$—see FIGS. 17 and 19—into a time-limited 50% flux state $\phi_o$. Additionally, strobe pulse 44 is of a duration $D=50$ ns. (nanoseconds) which is also chosen as the delay increment D which is the incremental delay time of the delays of FIGS. 1 and 2 and which is also the incremental delay of strobe pulse 44 with respect to transient signal 14. As illustrated in FIG. 14 pulses 170, 172, 174, 176–178 are the combined drive signals due to strobe pulse 44 and transient signal 14 for the delays of strobe pulse 44 delayed times 0, 2D, 4D, 6D, 26D, respectively.

Preparatory to the write-in operation constant current type clear generator 216 couples clear pulse 218, which is of a saturating amplitude-duration characteristic, to drive line 220 setting the magnetic states of cores 204, 206, 208 and 210 in an initial clear state $-\phi_s$—see FIGS. 16a, 17a, 18a, and 19a. Next, if the write-in operation is initiated without a transient signal 14 being coincident in time with the strobe pulse 44, constant current type strobe pulse generator 222 couples strobe pulse 44 to cores 204 and 206 of set 200 by way of drive line 224 and to cores 208 and 210 of set 202 by way of drive line 226. As stated before, strobe pulse 44 is of such a time-limited amplitude-duration characteristic such as to drive the magnetic states of cores 204, 206, 208 and 210 from their initial saturated state $-\phi_s$ to a time-limited 50% flux state $\phi_o$—see FIGS. 16a, 17a, 18a, and 19a. Note: as the operation of a transfluxor such as cores 206 and 210, operates on a transfer of the flux about the small aperture and as information is stored in the transfluxor by the effecting of a change in the magnetic state of the flux in leg 2 (see FIG. 15) between the large and small apertures, it is preferred that paths 2–3 of cores 206 and 210 be of substantially the same total flux capacity and reluctance as that of cores 204 and 206. Accordingly, when strobe pulse 44 is coupled to cores 206 and 210 the flux paths defined by paths 2–3 around the large apertures of cores 206 and 210 are placed in the same time-limited 50% flux state $\phi_o$ as are the flux paths of cores 204 and 208. In this respect the operation of the flux about the large apertures as limited by the dimensions of leg 2 of cores 206 and 210 function substantially the same as that of cores 204 and 208. It is to be understood that such limitation—the limitation that the flux paths defined by paths 2–3 around the large apertures of cores 206 and 210 are to be substantially similar to the flux paths defined by cores 204 and 208—is not necessary to the operation of the present invention, but is merely utilized to expedite the explanation of the operation of the embodiment of FIG. 15.

For the readout operation, constant current type read-reset signal generator 230 couples saturating amplitude-duration characteristic—with respect to flux path 1–2 around the small apertures of cores 206 and 210—read pulse 232 to the small apertures of cores 206 and 210 by way of drive line 234. As sense amplifier 236 is coupled to the small apertures of cores 206 and 210 in the opposite magnetic sense by sense line 238, the flux changes about the small apertures of 206 and 210 (due to the action of the read pulse 232 coupled thereto and to the flux states about paths 2–3 of the large apertures of cores 206 and 210 being of an equal and same magnetic sense) cause the difference-signal induced in sense line 238 to be substantially zero. Accordingly, with no transient signal 14 having been sampled by the concurrent action of a strobe pulse 44, sense amplifier 236 will produce an output signal of zero amplitude indicative of no signal having been stored therein.

Next, assume that the transient signal 14 is to be sampled at a time subsequent to its initiation at time $t=0$, such as at a time $t=0.3$ μsec. or at a delay of $D=6$ with respect to the initiation of the transient signal 14. As before, the preparatory or set-up operation is initiated when constant current type clear generator 216 couples clear-pulse 218 to cores 204, 206, 208 and 210 by way of drive line 220 setting the magnetic states of cores 204, 206, 208 and 210 in an initial clear state $-\phi_s$. Next, at a time $t=0$, signal generator 212 couples transient signal 14 to signal cores 204 and 208 by way of drive line 214. At a time $t=0.3$ μsec. after the initiation of the transient signal 14 strobe pulse generator 222 couples strobe pulse 44 to cores 204 and 206 of set 200 by way of line 224 and to cores 208 and 210 of set 222 by way of drive line 226. At such time, i.e., when strobe pulse 44 is delayed a period $D=6$ with respect to transient signal 14, the coincident-in-time accumulative effect of transient signal 14 to strobe pulse 44 produces pulse 176—see FIG. 14—which is coupled to signal cores 204 and 208. As before, only strobe pulse 44 is coupled to information cores 206 and 210. However, as discussed before with respect to the generation of the back EMF due to a drive signal coupling a core causing the core to undergo a flux change therein, there is generated in drive lines 224 and 226 a back EMF due to the sampled portion of transient signal 14 which is that portion of transient signal 14 that is coincident-in-time with the delayed strobe pulse 44. This back EMF has the effect of changing the effectiveness of strobe pulse 44 causing the magnetic states of cores 204, 206, 208 and 210 to assume the flux states of $\phi_1$, $\phi_2$, $\phi_3$, and $\phi_4$, respectively, as illustrated in FIGS. 17b, 16b, 19b, and 18b, respectively.

For the readout operation constant current type read-reset signal generator 230 couples read pulse 232 to the small apertures of cores 206 and 210 by way of drive line 234. Read pulse 232 causes the magnetic state of the flux of path 1–2 of core 206 to move from the flux state $\phi_2$ to its original set flux state $-\phi_s$ while the flux of path 1–2 of core 210 is caused to move from its setfluxstate $\phi_4$ back to its original set state $-\phi_s$. As described above, due to the winding sense of sense line 238 with the small apertures of cores 206 and 210, there is produced a net flux change effect in sense line 238 of $\phi_4$, $\phi_2$ inducing an output signal 242 in sense line 238 which is coupled to sense amplifier 236. After readout, read-reset signal generator 230 couples reset pulse 240 to drive line 234 resetting the magnetic state of paths 1–2 of cores 206 and 210 back into their set states $\phi_2$ and $\phi_4$ respectively.

In certain instances wherein accurate equalization of the impedances of drive lines 224 and 226 is desired a resistor 244, of say 10 ohms, may be utilized. Additionally, diodes 246 and 248 may be inserted in strobe pulse drive lines 224 and 226, respectively, if excessive circulating currents appear therein.

Figure 20:
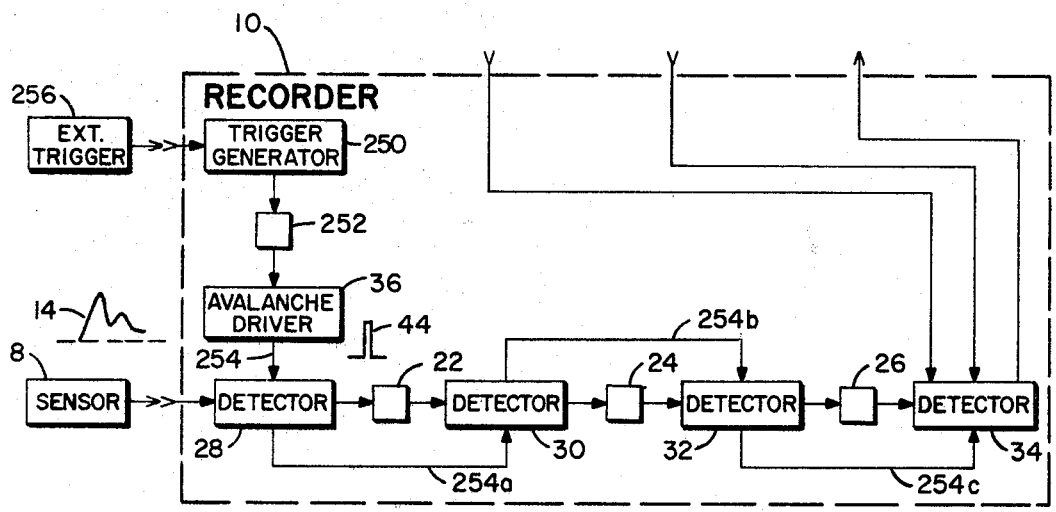
FIG. 20 is a block diagram of a third preferred embodiment of the recorder of FIG. 1 providing serial coupling of the strobe pulse and of the transient signal to the detector elements.

With particular reference to FIG. 20 there is disclosed a block diagram of a third preferred embodiment of the present invention wherein one feature of the detector 198 of FIG. 15 (that feature being that there is no effect on the external line impedance of the strobe pulse drive line due to the back EMF induced in the internally intercoupled strobe pulse drive lines by the transient signal sampled portion) is utilized to a high degree. In this embodiment sensor 8 couples a transient signal, for example signal 14, to the serial string of detector 28, delay 22, detector 30, delay 24, detector 32, delay 26, detector 34. Signal 14 travels through such serial string in a serial manner delayed by each of delays 22, 24 and 26 an appropriate delay time, for example 2D, 2D and 2D, respectively, providing a total delay at detector 34 of 6D. Trigger generator 250 couples an appropriate trigger pulse to avalanche driver 36 by way of delay 252 causing avalanche driver 36 to couple strobe pulse 44 to strobe pulse drive line 254. Strobe pulse drive line 254 is serially coupled through the cores of detectors 28, 30, 32 and 34 in the same manner as internally intercoupled strobe pulse drive lines 224 and 226 of FIG. 15 with such internally intercoupled lines in turn serially coupled by external strobe pulse drive lines 254a, 254b and 254c. In this manner both transient signal 14 and strobe pulse 44 pass serially through the serial string of detectors 28, 30, 32 and 34. Trigger generator 250 may be of a cnventional pulse amplifier design such that it emits an appropriate trigger pulse when triggered by an external trigger 256. Alternatively, trigger generator 250 may trigger in an avalanche mode when subjected to an external, high radiation level.

With delays 22, 24 and 26 each providing a delay of 2D for a total delay of 6D of transient signal 14 at detector 34 the delay of delay 252 if set to provide a like delay of 6D would provide a sampling of the leading edge of transient signal 14 over the duration of strobe pulse 44 in detector 34. Accordingly, with this arrangement pulses 170, 172, 174 and 176 of FIG. 14 would be gated into detectors 34, 32, 20 and 28, respectively.

Readout of the information stored in the recorder of FIG. 20 is similar to that of FIG. 1. Although the control and output lines of detector 34 only are illustrated it is apparent that such lines for detectors 28, 30 and 32 are utilized but are here omitted for clarity.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A portable radiation-hardened recording system, comprising:
   a serial-string of a plurality of magnetizable detector means;
   a plurality of delay means, a separate one intermediate adjacent ones of said plurality of detector means;
   a transient signal drive line serially intercoupling said serial string of detector means and delay means;
   sensor means for coupling a relatively long duration transient electrical signal having a varying amplitude to said transient signal drive line;
   a strobe pulse drive line serially intercoupling only said detector means;
   strobe pulse generator means for coupling a relatively short duration time-limited strobe pulse to said strobe pulse drive line;
   said strobe pulse generator means coupling said strobe pulse to said strobe pulse drive line coincident with said sensor means coupling said transient signal to said transient signal drive line;
   said strobe pulse coincident at each of said detector means with a different relatively short duration sampled portion of said transient signal;
   each of said detector means recording its respective transient signal sampled portion as a respective time-limited flux level.

2. A portable radiation-hardened recording system, comprising:
   a serial-string of a plurality of magnetizable detector means;
   a plurality of delay means, a separate one intermediate adjacent ones of said plurality of detector means;
   a transient signal drive line serially intercoupling said serial string of detector means and delay means;
   sensor means for coupling a relatively long duration transient electrical signal having a varying amplitude to said transient signal drive line;
   a strobe pulse drive line serially intercoupling only said detector means;
   constant current type strobe pulse generator means for coupling a relatively short duration time-limited strobe pulse to said strobe pulse drive line;
   said strobe pulse generator means coupling said strobe pulse to said strobe pulse drive line coincident with said sensor means coupling said transient signal to said transient signal drive line;
   said strobe pulse coincident at each of said detector means with a different relatively short duration sampled portion of said transient signal;
   each of said detector means recording its respective transient signal sampled portions as a respective time-limited flux level as a function of the said transient signal sampled portion produced back EMF affecting a corresponding change in the effect of said strobe pulse upon the magnetization of said detector means.

3. A portable radiation-hardened recording system, comprising:
   a serial string of a plurality of detector means;
   a plurality of delay means, a separate one serially electrically intermediate adjacent ones of said plurality of detector means;
   each of said detector means including first and second transfluxor type information cores and first and second toroidal ferrite type signal cores;
   constant current type transient signal generator means serially coupled only to the signal cores of said plurality of detector means and to said delay means for coupling thereto a relatively long duration transient signal having a varying amplitude;
   constant current type strobe generator means serially coupled only to said serial string of detector means for coupling a relatively short duration time-limited strobe pulse to all of said cores of said serial string of detector means;
   each of said delay means coupling a respectively delayed transient signal to the next subsequent detector means;

said strobe pulse coincident at each detector means with a relatively short duration different sampled portion of said transient signal;

each of said detector means storing a separate sampled portion of said transient signal when strobed by said strobe pulse;

each of said transient signal sampled portions stored in its respective detector means information cores as a respective time-limited flux level.

4. A portable radiation-hardened recording system, comprising:

a serial string of a plurality of detector means;

a plurality of delay means, a separate one serially electrically intermediate an adjacent one of said plurality of detector means;

each of said detector means including first and second transfluxor type information cores and first and second toroidal ferrite type signal cores;

constant current type transient signal generator means serially coupled only to the signal cores of said plurality of detector means and to said delay means for coupling thereto a relatively long duration transient signal having a varying amplitude;

constant current type strobe generator means serially coupled only to said serial string of detector means for coupling a relatively short duration time-limited strobe pulse to all of said cores of said serial string of detector means;

each of said delay means coupling a respectively delayed transient signal to the next subsequent detector means;

said strobe pulse coincident at each detector means with a relatively short duration different sampled portion of said transient signal;

each of said detector means storing a separate sampled portion of said transient signal when strobed by said strobe pulse;

each of said transient signal sampled portions stored in its respective detector means information cores as a respective time-limited flux level as a function of the said transient signal sampled portion produced back EMF affecting a corresponding change in the effect of said strobe pulse upon the magnetization of said information cores.

5. A portable radiation-hardened recording system, comprising:

a plurality of parallel arranged detector sets, each detector set including a serial string of a sensor means and a plurality of detector means;

each of said sensor means detecting a separate transient phenomenon and providing a corresponding electrical transient signal having a varying amplitude;

each of said detector means including a magnetizable memory element for the storage of a different sampled portion of said corresponding transient signal as a respective different time-limited flux level;

a delay set including a serial string of a constant current type strobe generator means and a plurality of delay means;

said strobe generator means coupled electrically intermediate the sensor means and the next adjacent detector means of one of said detector sets for coupling a time-limited strobe pulse to said serial string of delay means upon activation by said corresponding transient signals;

each of said delay means coupling a respectively delayed strobe pulse to a correspondingly ordered detector means of each detector set;

each of said detector means of each detector set storing a separate sampled portion of its corresponding transient signal when strobed by its correspondingly ordered delay means;

each of said correspondingly transient signal sampled portions stored in its respective detector means as a respective time-limited flux level.

6. A portable radiation-hardened recording system, comprising:

a plurality of parallel arranged detector sets, each detector set including a serial string of a sensor means and a plurality of like ordered detector means, said like ordered detector means forming parallel groups of detector means;

each of said sensor means detecting a separate transient phenomenon and providing a corresponding electrical transient signal having a varying amplitude;

each of said detector means including a magnetizable memory element for the storage of a different sampled portion of said corresponding transient signal as a respective different time-limited flux level;

a plurality of delay means;

a separate associated strobe pulse drive line serially intercoupling each of said groups of detector means;

a separate one of said delay means coupled by an associated one of said strobe pulse drive lines electrically intermediate adjacent ones of said groups of detector means;

a strobe generator means coupling a time-limited strobe pulse to said strobe pulse drive line;

each of said delay means providing a respectively delayed strobe pulse to the next following group of detector means;

each of said detector means of each detector set storing a separate sample portion of its corresponding transient signal when strobed by its corresponding delay means;

each of said corresponding transient signal sampled portions stored in its respective detector means as a respective time-limited flux level.

7. A magnetic memory device comprising:

first and second substantially similar recording sets, each of said sets including:

a multiaperture type information core and a toroidal type signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

a strobe pulse drive line coupled to the signal core and to the large aperture of the information core;

the strobe pulse drive line of each set intercoupled at each end;

constant current type clear generator means for coupling a saturating clear pulse to the large apertures of the information cores and to the signal cores of said first and second sets for setting the magnetization of each of said cores into an initial substantially-saturated clear state;

constant current type strobe generator means for coupling a relatively short duration time-limited strobe pulse to said intercoupled strobe pulse drive lines intermediate the signal cores of said first and second sets for setting the magnetization of each of said information cores' first flux paths and of each of said signal cores into a time-limited set state from said clear state;

a signal drive line coupled only to the signal core of said first and second sets;

constant current type signal generator means for coupling a relatively long duration transient electrical signal having a varying amplitude to said signal drive line;

said strobe generator means coupling said strobe pulse to said signal cores and said information cores coincident with said signal generator means coupling said transient signal to said signal cores;

said strobe pulse coincident with a relatively short duration sampled portion of said transient signal;

said transient signal sampled portion producing opposing polarity flux changes in each of the signal cores with said opposing polarity flux changes inducing in each of said intercoupled strobe pulse drive lines a corresponding opposing back EMF corresponding to the polarity and amplitude of the transient signal sampled portion;

the corresponding opposing back EMF induced in the strobe pulse drive line of each set causing a change in the effective MMF of the strobe pulse in the strobe pulse drive line of each of said sets effecting an equal but opposite change in the magnetization of each of said sets' information cores' second flux paths' set state, whereby the changes in said magnetizations correspond to the polarity and amplitude of said transient signal sampled portion that is coupled to the signal cores of said first and second sets.

8. A portable radiation-hardened recording system, comprising:

a serial-string of a plurality of magnetizable detector means;

a plurality of delay means, a separate one intermediate adjacent ones of said plurality of detector means;

each of said detector means including:

first and second substantially similar recording sets, each of said sets including:

a transfluxor type information core and a toroidal ferrite type signal core, each of said cores having a substantially rectangular hysteresis characterstic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

a strobe pulse drive line coupled to the signal core and to the large aperture of the information core;

the strobe pulse drive line of each set intercoupled at each end;

strobe pulse drive line means serially intercoupling all of said intercoupled strobe pulse drive lines;

a signal drive line serially intercoupling all of said signal cores;

constant current type clear generator means for coupling a saturating clear pulse to the large apertures of the information cores and to the signal cores of said first and second sets for setting the magnetization of each of said cores into an initial substantially-saturated clear state;

constant current type strobe generator means for coupling a relatively short duration time-limited strobe pulse to said strobe pulse drive line means;

said strobe generator means coupling said strobe pulse to said signal cores and said information cores coincident with said signal generator means coupling said transient signal to said signal cores;

said strobe pulse coincident at each detector means with a relatively short duration different sampled portion of said transient signal;

constant current type signal generator means for coupling a relatively long duration transient electrical signal having a varying amplitude to said signal drive line;

said transient signal samples portion at each detector means producing opposing polarity flux changes in each of the signal cores of its said first and second sets with said opposing polarity flux changes inducing in each of said detector means intercoupled strobe pulse drive lines a corresponding opposing back EMF corresponding to the polarity and amplitude of the transient signal sampled portion at that detector means;

the corresponding opposing back EMF induced in the strobe pulse drive line of each set of each detector means causing a corresponding change in the effective MMF of the strobe pulse in the strobe pulse drive line of each of said sets effecting an equal but opposite corresponding change in the magnetization of each of said sets' information cores' first flux paths' set state, whereby the changes in said magnetizations correspond to the polarity and amplitude of the particular transient signal sampled portion that is coupled to the signal cores of said first and second sets of each of said detector means;

a separate sense line coupled to the small apertures of the information cores of said first and second sets of each of said detector means;

separate read-reset generator means for coupling a separate saturating read pulse to the small apertures of the information cores of said first and second sets of each separate detector means for separately setting the magnetization of each of said information cores' second flux paths into one of their saturated states thereby inducing an output signal in said separate sense line that is representative of the polarity and amplitude of said particular transient signal sampled portion.

9. A portable radiation-hardened recording system, comprising:

a plurality of parallel arranged serial-strings of a plurality of like ordered detector means;

each of said detector means including:

first and second substantially similar recording sets, each of said sets including:

a transfluxor type information core and a toroidal ferrite type signal core, each of said cores having a substantially rectanglar hysteresis characteristic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

a strobe pulse drive line coupled to the signal core and to the large aperture of the information core;

the strobe pulse drive line of each set intercoupled at each end;

strobe pulse drive line means serially intercoupling all of the intercoupled strobe pulse drive lines of the like ordered detector means;

a plurality of delay means, a separate one intercoupling adjacent like ordered intercoupled pulse drive lines of said plurality of like ordered detector means;

a signal drive line serially intercoupling all of said signal cores of said plurality of detector means;

clear generator means for coupling a saturating clear pulse to the large apertures of the information cores and to the signal cores of said first and second sets for setting the magnetization of each of said cores into an initial substantially-saturated clear state;

strobe generator means for coupling a relatively short duration time-limited strobe pulse to said strobe pulse drive line means;

said strobe generator means coupling said stroke pulse to said signal cores and said information cores coincident with said signal generator means coupling said transient signal to said signal cores;

said strobe pulse coincident at each detector means with a relatively short duration different sampled portion of said transient signal;

signal generator means for coupling a relatively long duration transient electrical signal having a varying amplitude to said signal drive line;

said transient signal sampled portion at each detector means producing opposing polarity flux changes in each of the signal cores of its said first and second sets with opposing polarity flux changes inducing in each of said detector means intercoupled strobe pulse drive lines a corresponding opposing back EMF corresponding to the polarity and amplitude of the transient signal sampled portion at that detector means;

the corresponding opposing back EMF induced in the strobe pulse drive line of each set of each detector means causing a corresponding change in the effective MMF of the strobe pulse in the strobe pulse drive line of each of said sets effecting an equal but opposite corresponding change in the magnetization of each of said sets' information cores' first flux paths' set state, whereby the changes in said magnetizations correspond to the polarity and amplitude of the particular transient signal sampled portion that is coupled to the signal cores of said first and second sets of each of said detector means;

a separate sense line coupled to the small apertures of the information cores of said first and second sets of each of said detector means;

separate read-reset generator means for coupling a separate saturating read pulse to the small apertures of the information cores of said first and second sets of each detector means for separately setting the magnetization of each of said information cores' second flux paths into one of their saturated states thereby inducing an output signal in said separate sense line that is representative of the polarity and amplitude of said particular transient signal sampled portion.

10. A magnetic memory device comprising:

first and second substantially similar recording sets, each of said sets including:

a transfluxor type information core and a toroidal ferrite type signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

a strobe pulse drive line coupled to the signal core and to the large aperture of the information core;

the strobe pulse drive line of each set intercoupled at each end;

constant current type clear generator means for coupling a saturating clear pulse to the large apertures of the inforation cores and to the signal cores of said first and second sets for setting the magnetization of each of said cores into an initial substantially-saturated clear state;

constant current type strobe generator means for coupling a time-limited strobe pulse to said intercoupled strobe pulse drive lines intermediate the signal cores of said first and second sets for setting the magnetization of each of said information cores' first flux paths and of each of said signal cores into a time-limited set state from said clear state;

a signal drive line coupled only to the signal core of said first and second sets;

constant current type signal generator means for coupling a relatively long duration transient electrical signal having a varying amplitude to said signal drive line;

said strobe generator means coupling said strobe pulse to said signal and information cores of said first and second sets coincident with said signal generator means coupling said transient signal to the signal core of said first and second sets;

said strobe pulse coincident with a relatively short duration sampled portion of said transient signal;

said transient signal sampled portion producing opposing polarity flux changes in each of the signal cores of said first and second sets with said opposing polarity flux changes inducing in each of said intercoupled strobe pulse drive lines a corresponding opposing back EMF corresponding to the polarity and amplitude of the transient signal sampled portion;

the corresponding opposing back EMF induced in the strobe pulse drive line of each set causing a change in the effective MMF of the strobe pulse in the strobe pulse drive line of each of said sets effecting an equal but opposite change in the magnetization of each of said sets' information cores' second flux paths' set state, whereby the changes in said magnetizations correspond to the polarity and amplitude of said transient signal sampled portion that is coupled to the signal cores of said first and second sets;

a sense line coupled to the small apertures of the information cores of said first and second sets;

read-reset generator means for coupling a saturating read pulse to the small apertures of the information cores of said first and second sets for setting the magnetization of each of said information cores second flux paths into one of their saturated states thereby inducing an output signal in said sense line that is representative of the polarity and amplitude of said transient signal sampled portion.

11. A magnetic memory device comprising:

first and second substantially similar recording sets, each of said sets including:

a transfluxor type information core and a toroidal ferrite type signal core, each of said cores having a substantially rectangular hysteresis characteristic and being capable of being operated in a time-limited, an amplitude-limited or a saturated magnetic condition as a function of a magnetic field of a predetermined amplitude-duration characteristic;

said information core having spaced-apart relatively large and small apertures therethrough forming first and second flux paths, respectively, thereabout;

a strobe pulse drive line coupled to the signal core and to the large aperture of the information core;

the strobe pulse drive line of each set intercoupled at each end;

constant current type clear generator means for coupling a saturating clear pulse to the large apertures of the information cores and to the signal cores of said first and second sets for setting the magnetization of each of said cores into an initial substantially-saturated clear state;

constant current type strobe generator means for coupling a relatively short duration time-limited strobe pulse to said intercoupled strobe pulse drive lines intermediate the signal cores of said first and second sets for setting the magnetization of each of said information cores' first flux paths and of each of said signal cores into a time-limited set state from said clear state;

a signal drive line coupled only to the signal core of said first and second sets;

constant current type signal generator means for coupling a relatively long duration transient electrical signal having a varying amplitude to said signal drive line;

said strobe generator means coupling said strobe pulse to said signal and information cores of said first and second sets coincident with said signal generator means coupling said transient signal to the signal core of said first and second sets;

said strobe pulse coincident with a relatively short duration sampled portion of said transient signal;

said transient signal sampled portion producing opposing polarity flux changes in each of the signal cores of said first and second sets with said opposing polarity flux changes inducing in each of said intercoupled strobe pulse drive lines a corresponding opposing back EMF corresponding to the polarity and amplitude of the transient signal sampled portion;

the corresponding opposing back EMF induced in the strobe pulse drive line of each set causing a change in the effective MMF of the stroke pulse in the strobe pulse drive line of each of said sets effecting an equal but opposite change in the magnetization of each of said sets' information cores' second flux paths' set state, whereby the changes in said magnetizations correspond to the polarity and amplitude of said transient signal sampled portion that is coupled to said signal cores of said first and second sets;

a sense line coupled to the small apertures of the information cores of said first and second sets in an opposing magnetic sense;

read-reset generator means for coupling a saturating read pulse to the small apertures of the information cores of said first and second sets for setting the magnetization of each of said information cores' second flux paths into one of their saturated states thereby inducing a difference-signal in said sense line that is representative of the polarity and amplitude of siad transient signal sampled portion.

References Cited

UNITED STATES PATENTS

| | | | |
|---|---|---|---|
| 2,817,815 | 12/1957 | Evans | 328—151 |
| 2,881,255 | 4/1959 | Hall | 328—151 |
| 2,896,193 | 7/1959 | Herrmann | 340—174 |
| 2,896,194 | 7/1959 | Crane | 340—174 |
| 3,007,140 | 10/1961 | Minnick | 340—174 |
| 3,063,014 | 11/1962 | Shanks | 328—151 |
| 3,133,254 | 5/1964 | Lindsey | 328—151 |

RODNEY D. BENNETT, *Primary Examiner.*

U.S. Cl. X.R.

250—83.3